United States Patent
Garner et al.

(10) Patent No.: US 9,751,720 B2
(45) Date of Patent: Sep. 5, 2017

(54) GLASS WEBS AND METHODS OF SPLICING

(71) Applicant: CORNING INCORPORATED, Corning, NY (US)

(72) Inventors: Sean Matthew Garner, Elmira, NY (US); Richard Jonathon Kohler, Hilton, NY (US); Sue Camille Lewis, Webster, NY (US); Lynn Bernard Simpson, Painted Post, NY (US); Lili Tian, Laural, MD (US)

(73) Assignee: Corning Incorporated, Corning, NY (US)

( * ) Notice: Subject to any disclaimer, the term of this patent is extended or adjusted under 35 U.S.C. 154(b) by 154 days.

(21) Appl. No.: 14/437,625

(22) PCT Filed: Oct. 22, 2013

(86) PCT No.: PCT/US2013/066005
§ 371 (c)(1),
(2) Date: Apr. 22, 2015

(87) PCT Pub. No.: WO2014/066282
PCT Pub. Date: May 1, 2014

(65) Prior Publication Data
US 2015/0251873 A1    Sep. 10, 2015

Related U.S. Application Data

(60) Provisional application No. 61/716,685, filed on Oct. 22, 2012.

(51) Int. Cl.
*B65H 69/06* (2006.01)
*B65H 19/18* (2006.01)
(Continued)

(52) U.S. Cl.
CPC ............. *B65H 69/06* (2013.01); *B65H 19/18* (2013.01); *B65H 19/1852* (2013.01);
(Continued)

(58) Field of Classification Search
None
See application file for complete search history.

(56) References Cited

U.S. PATENT DOCUMENTS 1,105,610 A    8/1914   Bicheroux
1,731,820 A    10/1929  Lewis
(Continued)

FOREIGN PATENT DOCUMENTS

CN    201520736 U    7/2010
DE    103.23.303 A1  5/2003
(Continued)

OTHER PUBLICATIONS

Yoichi (JP 2012-076410 A) (Apr. 19, 2012) (JPP machine translation to English).*
(Continued)

*Primary Examiner* — David Sample
*Assistant Examiner* — Donald M Flores, Jr.
(74) *Attorney, Agent, or Firm* — Jeffrey A. Schmidt

(57) ABSTRACT

Glass web including a first glass-web portion (30), a second portion (40), and a splice joint (50) coupling the first glass-web portion to the second portion, wherein the slice joint includes a splice member (60) with at least one gas-permeable attachment portion. In further examples, methods of splicing a first glass-web portion to a second portion include the step of splicing the first glass-web portion to the second portion with a splice member, wherein the step of splicing includes attaching a gas-permeable attachment portion of the splice member to the first glass-web portion.

9 Claims, 8 Drawing Sheets

(51) Int. Cl.
*C03B 33/02* (2006.01)
*C03B 33/023* (2006.01)
*C03B 33/07* (2006.01)

(52) U.S. Cl.
CPC ............... *B65H 2301/4621* (2013.01); *B65H 2301/4631* (2013.01); *B65H 2801/61* (2013.01); *B65H 2801/87* (2013.01); *C03B 33/02* (2013.01); *C03B 33/0235* (2013.01); *C03B 33/074* (2013.01); *Y10T 83/0405* (2015.04); *Y10T 428/18* (2015.01); *Y10T 428/192* (2015.01)

(56) References Cited

U.S. PATENT DOCUMENTS

| | | | |
|---|---|---|---|
| 2,386,346 A | 10/1945 | Roesen | |
| 3,233,489 A | 2/1966 | Quarve | |
| 3,292,477 A | 12/1966 | Raftery | |
| 3,455,077 A | 7/1969 | Long | |
| 3,573,146 A | 3/1971 | Guinan et al. | |
| 3,833,447 A | 9/1974 | Gustafson | |
| 4,110,501 A | 8/1978 | Tarbell et al. | |
| 4,120,739 A | 10/1978 | Peeters et al. | 156/506 |
| 5,118,453 A | 6/1992 | Leyens et al. | |
| 5,323,981 A | 6/1994 | Dionne | |
| 5,622,540 A | 4/1997 | Stevens | |
| 5,692,699 A | 12/1997 | Weirauch et al. | |
| 6,488,228 B2 | 12/2002 | Davies et al. | 242/556.1 |
| 6,735,982 B2 | 5/2004 | Matthies | |
| 6,815,070 B1 | 11/2004 | Burkle et al. | 428/425.6 |
| 6,951,676 B2 * | 10/2005 | Shaw | B65H 19/102 |
| | | | 156/502 |
| 7,875,138 B2 | 1/2011 | Yamada et al. | 156/64 |
| 2004/0172975 A1 | 9/2004 | Hirota et al. | |
| 2004/0219355 A1 | 11/2004 | Clemmens et al. | 428/343 |
| 2005/0245051 A1 | 11/2005 | Maekawa et al. | 438/462 |
| 2006/0083894 A1 * | 4/2006 | Vetrovec | C09J 7/026 |
| | | | 428/137 |
| 2006/0109416 A1 | 5/2006 | Smovzh | 349/187 |
| 2007/0170300 A1 | 7/2007 | Titz et al. | |
| 2007/0254136 A1 | 11/2007 | Kato et al. | |
| 2008/0050888 A1 | 2/2008 | Garner et al. | |
| 2009/0081851 A1 | 3/2009 | Sakamoto et al. | 438/463 |
| 2009/0250446 A1 | 10/2009 | Sakamoto | 219/121.72 |
| 2010/0162758 A1 | 7/2010 | Lang | 65/29.11 |
| 2010/0192634 A1 | 8/2010 | Higuchi et al. | 65/60.1 |
| 2011/0192878 A1 | 8/2011 | Teranishi et al. | 226/1 |
| 2012/0015132 A1 * | 1/2012 | Hasegawa | B65H 21/00 |
| | | | 428/61 |

FOREIGN PATENT DOCUMENTS

| | | |
|---|---|---|
| EP | 1127821 A2 | 2/2001 |
| JP | 03-128847 | 5/1991 |
| JP | 04-243755 | 8/1992 |
| JP | 05297334 | 11/1993 |
| JP | 05297334 A | 11/1993 |
| JP | 2005-225925 | 8/2005 |
| JP | 2006-250345 | 9/2006 |
| JP | 2012076410 A * | 4/2012 ............. B32B 17/04 |
| JP | 2015134705 A | 7/2015 |
| WO | 03-029157 A1 | 4/2003 |
| WO | 2010/-038757 A1 | 4/2010 |
| WO | 2010-038761 A1 | 4/2010 |
| WO | 2012-074971 A2 | 6/2012 |
| WO | WO 2012074971 A2 * | 6/2012 ......... B65H 19/1852 |
| WO | 2015174216 A1 | 11/2015 |

OTHER PUBLICATIONS

English Translation of CN201380055236.9 First Office Action Dated Nov. 30, 2016, China Patent Office.
International Search Report and Written Opinion PCT/US2013/066005 Dated Jan. 27, 2014.
TW102137932 Search Report Dated Oct. 20, 2016, Taiwan Patent Office.

* cited by examiner

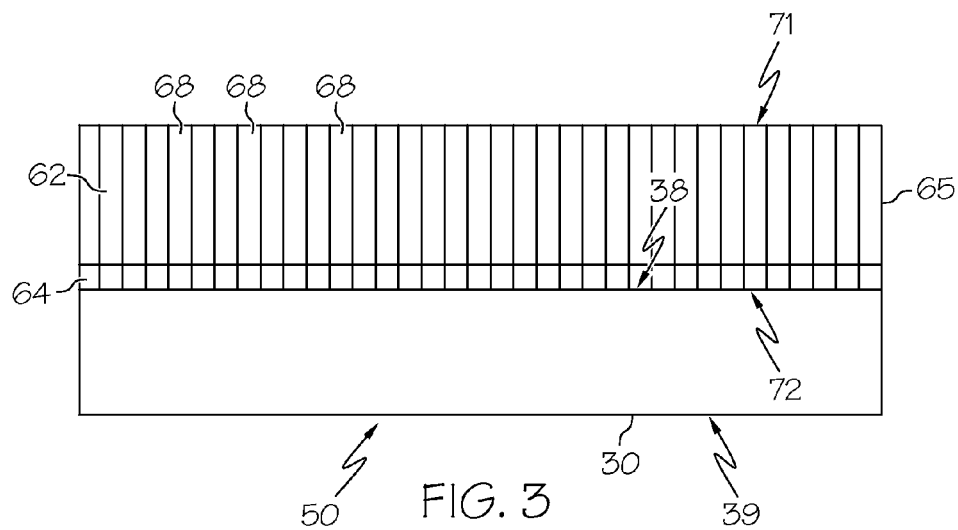
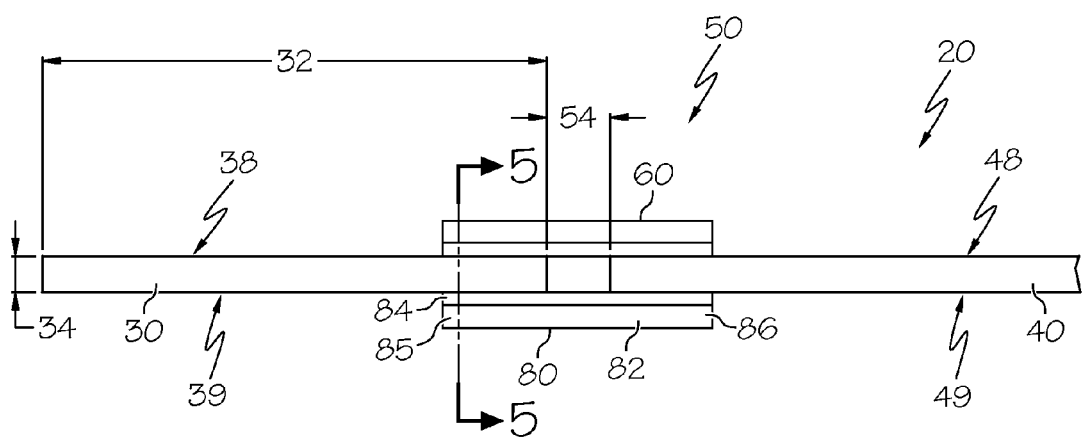

GLASS WEBS AND METHODS OF SPLICING

This application claims the benefit of priority under 35 U.S.C. §371 of International Patent Application Serial No. PCT/US13/66005, filed on Oct. 22, 2013 designating the United States of America, which claims the benefit of priority under 35 U.S.C. §119 of U.S. Provisional Application Ser. No. 61/716,685, filed on Oct. 22, 2012, the content of which is relied upon and incorporated herein by reference in its entirety.

FIELD

The present disclosure relates generally to glass webs and methods of splicing and, more particularly, to glass webs and methods of splicing a first glass-web portion to a second portion.

BACKGROUND

There is interest in using glass in roll-to-roll fabrication of flexible electronic or other devices. Flexible glass web can have several beneficial properties related to either the fabrication or performance of electronic devices, for example, liquid crystal displays (LCDs), electrophoretic displays (EPD), organic light emitting diode displays (OLEDs), plasma display panels (PDPs), touch sensors, photovoltaics, etc. A critical component in the use of spooled flexible glass in roll-to-roll processes is the ability to splice web segments together (either be it one glass portion to another, or a glass portion to a leader/trailer material). The splice technology for the plastic, metal, and paper industry is mature, and techniques are known. Glass web, however, has a unique set of properties and requires unique splice designs and processes.

To enable use at higher temperatures that a glass web enables, recently wider splice tape with increased surface area has been used. This wider splice tape enables more adhesion between the leader/trailer and the glass web. The wider splice tape, however, also allows an increased chance for entrapped gas between the tape and the web. This entrapped gas under the tape can expand to form gas blisters, for example, when the spliced web is put into a vacuum deposition system. The expansion may become even more significant when heat is introduced. Mechanical failures of the splice and also fracturing of the glass web have been observed and attributed to these entrapped gas blisters under the splice tape. Accordingly, there is a need for practical solutions for splicing glass web portions to one another or to other web materials, for example leader/trailer material, that reduce the potential for entrapped gas blisters and the probability of splice failure.

SUMMARY

There are set forth various structures and methods for splicing glass web portions to one another as well as to other web materials, for example, leader/trailer materials. Throughout the disclosure the term "glass" is used for the sake of convenience, but is representative of other like brittle materials. For example, glass can refer to transparent glass (e.g., display-quality glass), glass ceramics, ceramics, and other materials that may be formed into flexible web or ribbon. The structures and methods disclosed herein provide a manner of achieving with glass, functions similar to those to which manufacturers are accustomed to for polymer, paper, and metal web material systems. These structures and methods also provide a splice that is less susceptible to forming gas blisters and/or more capable of slowing down growth, preventing growth, reducing the size, or even removing formed gas blisters entirely. As such, the structures and methods can help prevent failing of a splice joint due to blister formation.

The inventors have found various aspects of the splice joint itself, as well as of the manner of preparing the splice joint, that lead to a more durable glass web, i.e., one that will not form gas blisters when placed into a vacuum deposition system. For example, the inventors found that the portions of a splice member that attach to web portions can be gas-permeable. Gas permeability can be provided by either using materials to make the splice member that are gas permeable or by providing perforations that extend through the splice member. Thus, as the splice member is applied to the web portions, gas can escape through the gas-permeable splice member as opposed to becoming entrapped between the splice member and the web portions. Additionally, heat or pressure can be applied to the splice member to further remove any gas that may collect between the splice member and the web portions.

Additional features and advantages will be set forth in the detailed description which follows, and in part will be readily apparent to those skilled in the art from the description or recognized by practicing the invention as exemplified in the written description and the appended drawings. It is to be understood that both the foregoing general description and the following detailed description are merely exemplary of the invention, and are intended to provide an overview or framework to understanding the nature and character of the invention as it is claimed. By way of non-limiting example the various features of the invention may be combined with one another in various aspects as follows:

In a first aspect, a glass web includes a first glass-web portion, a second portion, and a splice joint coupling the first glass-web portion to the second portion, wherein the splice joint includes a splice member including at least one gas-permeable attachment portion.

In one example of the first aspect, the second portion includes a second glass-web portion.

In another example of the first aspect, a thickness of the first glass-web is from about 10 microns to about 300 microns.

In another example of the first aspect, the splice member includes a first surface facing the first glass-web portion and a second surface opposite the first surface, wherein the gas-permeable attachment portion extends all the way through the splice member from the first surface to the second surface.

In another example of the first aspect, the splice member includes a flexible membrane.

In another example of the first aspect, the flexible membrane is gas-permeable.

In another example of the first aspect, the attachment portion includes at least one vent aperture configured to provide gas permeability to the attachment portion. For instance, the splice member can include a first surface facing the first glass-web portion and a second surface opposite the first surface, wherein the at least one vent aperture extends all the way through the splice member from the first surface to the second surface. In another example, the at least one vent aperture includes a plurality of vent apertures arranged in a pattern to provide gas permeability to the attachment portion. In yet another example, the vent aperture includes a transverse dimension of less than or equal to about 2 mm.

In another example of the first aspect, the gas-permeable attachment portion includes a carrier layer and an adhesive layer attaching the carrier layer to the first glass-web portion.

In another example of the first aspect, the gas-permeable attachment portion includes an end portion of the second portion.

In another example of the first aspect, the splice joint is a butt joint including a gap between the first glass-web portion and the second portion. For example, the first glass-web portion can include a longitudinal axis and a width, and the gap is substantially perpendicular to the longitudinal axis across the width.

In another example of the first aspect, the first glass-web portion includes a first longitudinal axis, the splice member includes a longitudinal axis that is disposed substantially perpendicular to the first longitudinal axis.

The first aspect may be provided alone or in combination with any one or more of the examples of the first aspect discussed above.

In a second aspect, a method of splicing a first glass-web portion to a second portion includes the step (I) of splicing the first glass-web portion to the second portion with a splice member, wherein the step of splicing includes attaching a gas-permeable attachment portion of the splice member to the first glass-web portion.

In one example of the second aspect, the splice member includes a first surface and a second surface opposite the first surface and the gas-permeable attachment portion extends all the way through the splice member from the first surface to the second surface, wherein step (I), the first surface is attached to the first glass-web portion.

In another example of the second aspect, step (I) further includes attaching another gas-permeable attachment portion of the splice member to the second portion.

In another example of the second aspect, prior to step (I), the method includes the step of providing a gap between an end of the first glass-web portion and an end of the second portion, wherein step (I) provides a splice joint including a gap between the end of the first glass-web portion and the end of the second portion.

In another example of the second aspect, each of the first glass-web portion and the second portion include a first major surface and a second major surface with a thickness defined between the first and second major surface, and step (I) attaches the splice member to the first major surface of the first glass-web portion and the first major surface of the second portion. For instance, step (I) can provide a splice joint with the first major surface of the first glass-web portion configured to be oriented substantially coplanar with the first major surface of the second portion.

In another example of the second aspect, step (I) includes applying pressure to the splice member to attach the gas-permeable attachment portion of the splice member to the first glass-web portion.

In another example of the second aspect, step (I) includes applying heat to the splice member to attach the gas-permeable attachment portion of the splice member to the first glass-web portion.

The second aspect may be provided alone or in combination with any one or more of the examples of the second aspect discussed above.

BRIEF DESCRIPTION OF THE DRAWINGS

The above and other features, aspects and advantages of the present invention are better understood when the following detailed description of the invention is read with reference to the accompanying drawings, in which:

FIG. 3 is a cross-sectional view of a splice joint as taken along line 3-3 in FIG. 2;

FIG. 4 is a side view of a glass web having a splice joint according to a second embodiment;

DETAILED DESCRIPTION

Figure 1:
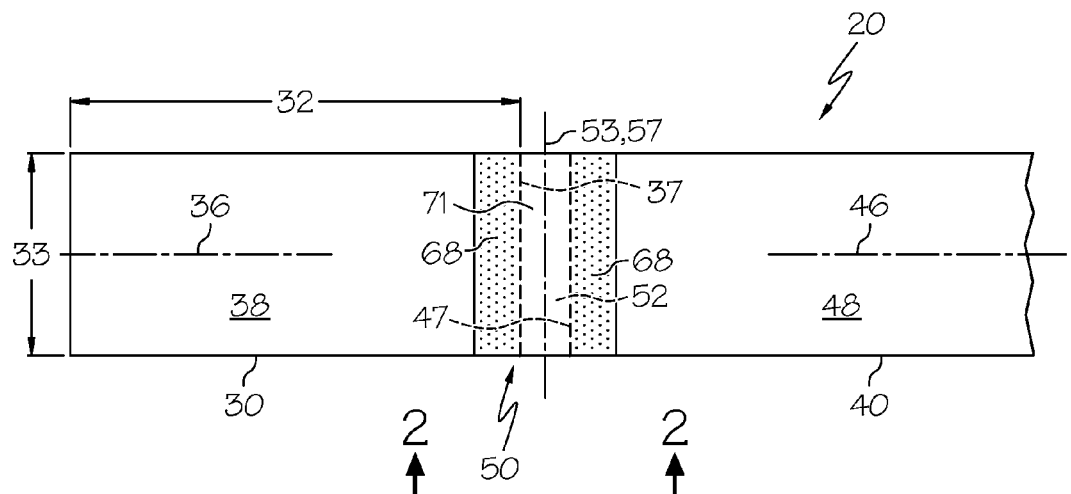
FIG. 1 is a top view of a glass web having a splice joint.

The present invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

FIG. 1 illustrates an example embodiment of a glass web 20 which includes a splice joint 50 that couples a first glass-web portion 30 to a second portion 40. The first glass-web portion 30 may comprise a flexible glass web that can include glass (e.g., transparent glass for example display quality transparent glass), glass ceramic, and ceramic materials and can also include multiple layers of inorganic and organic material. The glass web can also include additional layered materials on one or both surfaces including inorganic and organic films, coatings, and laminates. The first glass-web portion 30 can be produced by way of a down-drawn, up-draw, float, fusion, press rolling, or slot draw, glass forming process or other techniques. The second portion 40 may be glass web that includes similar materials to the first glass-web portion 30, or the second portion 40 may be a leader or trailer made of a material other than glass, for example, polymer, paper, or metal (e.g., metal foil).

Figure 2:
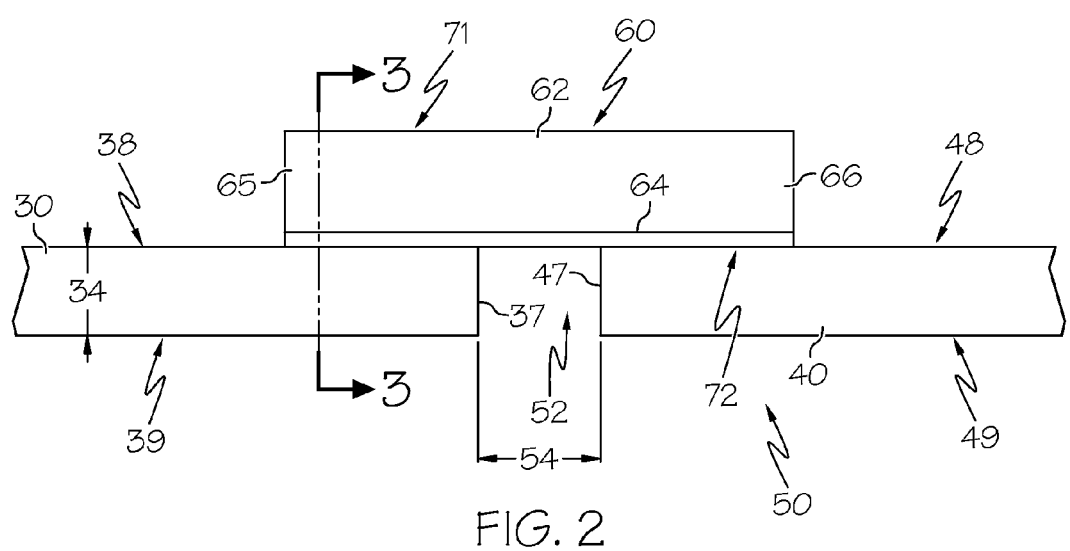
FIG. 2 is a side view of a glass web as seen along the direction of arrow 2 in FIG. 1.

As shown in FIGS. 1 and 2, the first glass-web portion 30 includes a length 32, a width 33, and a thickness 34. The first glass-web portion 30 includes a longitudinal axis 36 and an end 37 and, similarly, the second portion 40 includes a longitudinal axis 46 and an end 47. The first glass-web portion includes a first major surface 38 and a second major surface 39. Similarly, the second portion 40 includes a first major surface 48 and a second major surface 49. In just some examples, the length 32 of the first glass-web portion 30 can range from about 30 cm to about 1000 m and the width 33 can range from about 5 cm to about 1 m. In just some examples, the thickness 34 can range from about 10 microns to about 300 microns (for example, 10, 20, 30, 40, 50, 60, 70, 80, 90, 100, 125, 150, 175, 200, 225, 250, 275, or 300 microns), or, for example, from about 50 microns to about 200 microns. The dimensions of the second portion 40 can be the same or different from the first glass-web portion 30.

The splice joint 50 couples the first glass-web portion 30 to the second portion 40. There may be various different embodiments of the splice joint 50 itself. For example, a first embodiment illustrated in FIGS. 1-3 shows a one-sided butt joint with a gap 52 between the two portions 30, 40. In the example embodiment, ends 37, 47 are placed adjacent to one another so that longitudinal axis 36 may be coaxial with longitudinal axis 46, though, there may be embodiments where axis 36 and axis 46 are not coaxial. Additionally, ends 37, 47 are spaced apart by a gap 52 having a width 54. The gap 52 extends along a longitudinal axis 53 that may be optionally substantially perpendicular to the longitudinal axis 36. The width 54 of the gap 52 can between about 0.1 mm and about 5 mm (for example. 0.1, 0.5, 0.6, 0.7, 0.8, 0.9, 1.0, 1.2, 1.4, 1.6, 1.8, 1.9, 2.0, 2.5, 3.0, 3.5, 4.0, 4.5, or 5.0 mm) although other width sizes may be incorporated in alternative examples. The width 54 may be sized so that the ends 37, 47 do not rub against one another as the portions 30, 40 rotate about the axis 53 (or an axis parallel therewith within the width 54) as when, for example, bending around a roller in a downstream process through which the web 20 is conveyed. However, it should be appreciated that other widths may be used for the gap without departing from the scope of the invention. Moreover, there may be instances when the two portions 30, 40 are directly adjacent without any gap there between.

The splice joint 50 includes a splice member 60. The splice member 60 may be a self-adhesive tape, a film to which adhesive is applied, or a film which is laid over adhesive on the first glass-web portion 30 and the second portion 40. Alternatively, the splice member 60 may be a non-metallic member to which an electrostatic charge may be applied so as to electrostatically couple it to the first glass-web portion 30 and the second portion 40.

As shown, the splice member 60 in the example embodiment can optionally include a carrier layer 62, an adhesive layer 64, and a longitudinal axis 57. The splice member 60 can further include attachment portions 65, 66. These attachment portions 65, 66 connect the web portions 30, 40 through the splice member 60. The carrier layer 62 can comprise a film made of a flexible membrane for example a polymer, metal, or other material. The adhesive layer 64 can comprise, in some examples, a pressure sensitive or curable adhesive. The adhesive layer 64 of the splice member 60 may be applied to the portions 30, 40 and arranged so attachment portion 65 attaches to the first glass-web portion 30 and attachment portion 66 attaches to the second portion 40. Additionally, the splice member 60 may be arranged so that longitudinal axis 57 may be substantially perpendicular to longitudinal axis 36. In this embodiment, the splice member 60 is shown coupled to the first major surfaces 38, 48. However, alternatively, the splice member 60 may be coupled to one or both of the second major surfaces 39, 49 in further examples.

One or both of the attachment portions 65, 66 may be gas permeable. This can be accomplished in various ways. For example, the splice member 60, or portions of the splice member 60, may be gas permeable. In further examples, one or more apertures (e.g., perforations) may be provided through the splice member at the attachment portions 65, 66. For example, FIG. 3 is a cross-sectional view of attachment portion 65 which shows a plurality of vent apertures 68 that extend through the splice member 60 from a first surface 71 to second surface 72 opposing the first surface 71. The vent apertures 68 can provide gas permeability to the carrier layer 62 and/or the adhesive layer 64 that may not, in some examples, be gas permeable without the apertures 68. In some examples, the carrier layer 62 and/or the adhesive layer 64 may be gas permeable while also including the apertures 68. In such examples, the apertures 68 may enhance the gas permeability of the otherwise gas permeable layer. The vent apertures 68 can be any shape, though circular shapes may provide the highest strength and least resistance to tearing for the splice member. Each vent aperture 68 can include a transverse dimension of between about 1 micron and about 2 mm (for example, from 1, 2, 3, 4, 5, 6, 7, 8, 9, 10, 15, 20, 25, 30, 35, 40, 45, 50, 60, 70, 80, 90, 100, 125, 150, 175, 200, 250, or 300, microns to 0.5, 0.75, 1, 1.25, 1.5, 1.75, or 2 mm). Thus, as the attachment portion 65 is applied to the first glass-web portion 30, gas can escape through the vent apertures 68 rather than collecting between the attachment portion 65 and the first glass-web portion 30.

The plurality of vent apertures 68, if provided, can optionally be arranged in a pattern to provide gas permeability to the attachment portions 65, 66. For example, the vent apertures 68 may be arranged in the form of an array, as shown in FIG. 1. However, the vent apertures 68 may also be randomly positioned across the splice member 60. Moreover, the apertures 68 may be positioned partially across surface 71, as shown in FIG. 1, or the apertures 68 may be positioned across the entire surface 71.

Figure 5:
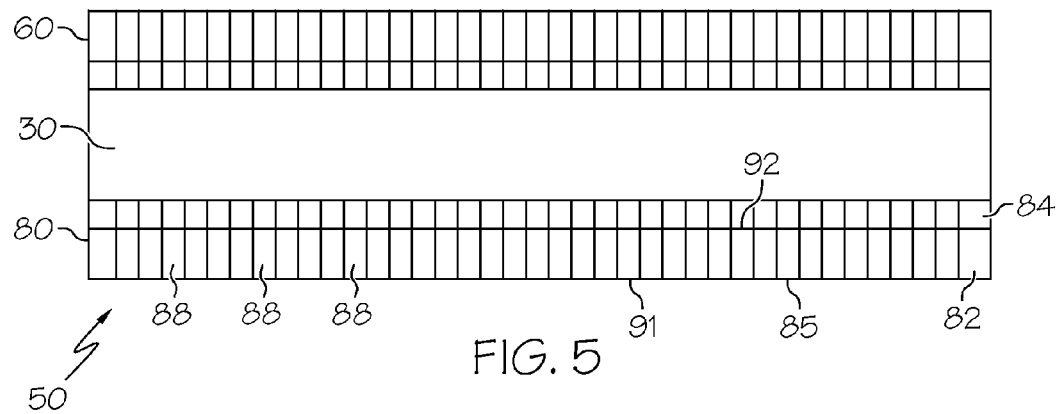
FIG. 5 is a cross-sectional view of a splice joint as taken along line 5-5 in FIG. 4.

A second embodiment of the splice joint 50 will be explained in connection with FIGS. 4-5. In this embodiment, mainly the differences from the first embodiment will be described, with the understanding that the remaining elements are similar, for example identical, to those described in connection with the first embodiment, and wherein like reference numerals denote like elements throughout the embodiments. The second embodiment similarly has a first glass-web portion 30, a second portion 40, and a splice member 60; all of which are arranged and have similar, for example identical, characteristics as in the first embodiment set forth above. However, the second embodiment further includes a second splice member 80 coupled to the second major surfaces 39, 49 to form a double-sided splice joint.

The second splice member 80 may have similar, for example the same, characteristics as set forth above in connection with the splice member 60 of the first embodiment. For example, as shown in FIG. 4, the second splice member 80 can include a carrier layer 82, adhesive layer 84, attachment portion 85, and attachment portion 86. The adhesive layer 84 of the second splice member 80 may be applied to the portions 30, 40 and arranged so attachment portion 85 attaches to the first glass-web portion 30 and attachment portion 86 attaches to the second portion 40.

In some examples, both attachment portions 85, 86 are gas permeable similar to the attachment portions 65, 66 of the first splice member 60. This can be accomplished either by using materials for the splice member 60 that are gas permeable and/or by providing perforations that extend through the attachment portions 85, 86. For example, FIG. 5 is a cross-sectional view of attachment portion 85 which shows a plurality of vent apertures 88 that extend through the second splice member 80 from a first surface 91 to second surface 92 opposed to the first surface 91. The vent apertures 88 can facilitate making the carrier layer 82 and adhesive layer 84 gas permeable. Alternatively, the vent apertures 88 could only extend through the carrier layer 82. Each vent aperture 88 can include a transverse dimension of between about 1 micron and about 2 mm although other size apertures may be used in further examples. Thus, as the attachment portion 85 is applied to the first glass-web portion 30, gas can escape through the vent apertures 88 rather than collecting between the attachment portion 85 and the first glass-web portion 30.

As with the first splice member 60, the plurality of vent apertures 88 can be arranged in a pattern to provide gas permeability to the attachment portions 85, 86. However, the vent apertures 88 may also be randomly positioned across the splice member 80. Moreover, the apertures 88 may be positioned partially across surface 91, or the apertures may be positioned across the entire surface 91.

Figure 6:
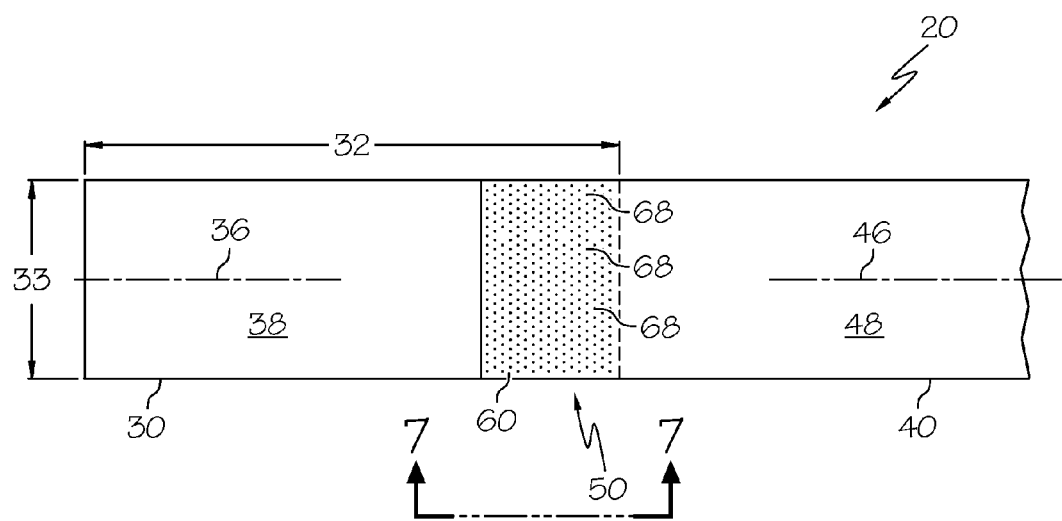
FIG. 6 is a top view of a glass web having a splice joint according to a third embodiment.
Figure 7:
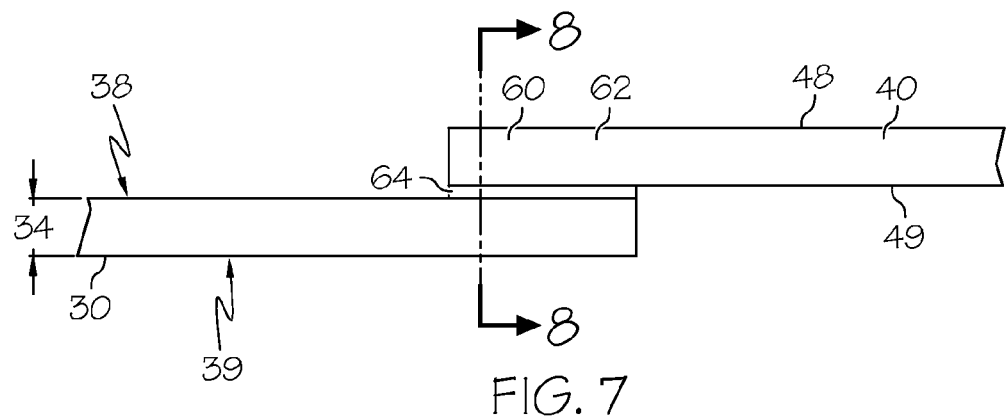
FIG. 7 is a side view of a glass web as seen along line 7-7 in FIG. 6.
Figure 8:
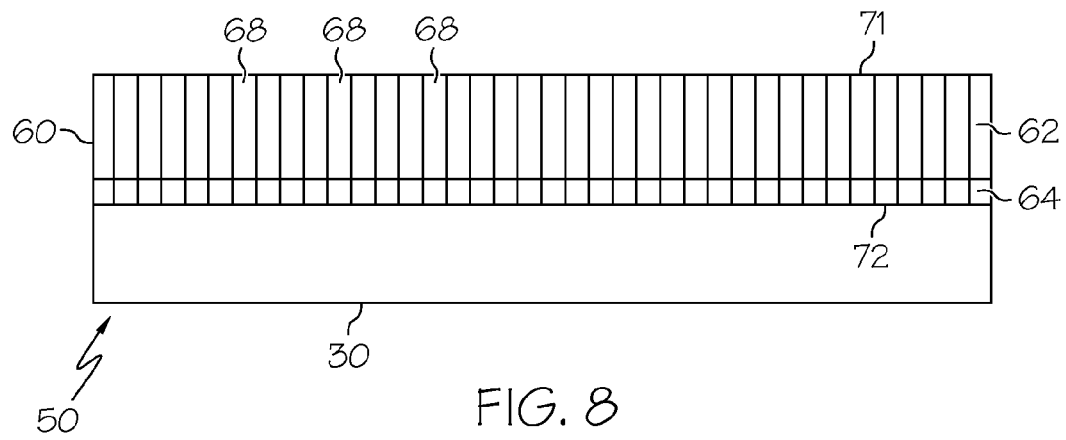
FIG. 8 is a cross-sectional view of a splice joint as taken along line 8-8 in FIG. 7.

A third embodiment of the splice joint 50 will now be explained in connection with FIGS. 6-8. In this embodiment, mainly the differences from the other embodiments will be described, with the understanding that the remaining elements are similar, for example identical, to those described in connection with the other embodiments, and wherein like reference numerals denote like elements throughout the embodiments. In this embodiment, the splice member 60 may be part of the second portion 40. The splice member 60 can similarly have a carrier layer 62 and an adhesive layer 64, as shown in FIG. 7. Alternatively, the splice member 60 may be a non-metallic member to which an electrostatic charge may be applied so as to electrostatically couple it to the first glass-web portion 30.

In the example embodiment, the adhesive layer 64 of the splice member 60 is arranged and applied to the first glass-web portion 30 so that the second portion 40 overlaps the first glass-web portion 30. Longitudinal axis 36 may be coaxial with longitudinal axis 46, although there may be embodiments wherein axis 36 and axis 46 are not coaxial. Additionally, although the splice member 60 is shown in FIGS. 7-8 as being coupled to the first major surface 38, alternatively, the splice member 60 may be coupled to the second major surface 39 instead.

Similar to the first embodiment, the splice member 60 can be gas permeable, particularly in the vicinity of the portion that attaches to the first glass-web portion 30. This can be accomplished either by using materials for the splice member 60 that are gas permeable or by providing apertures (e.g., perforations) that extend through the splice member 60. For example, FIG. 8 is a cross-sectional view of the splice member 60 which shows a plurality of vent apertures 68 that extend through the splice member 60 from surface 71 to surface 72, making the carrier layer 62 and adhesive layer 64 gas permeable. Each vent aperture can include various transverse dimensions, for example, between about 1 micron and about 2 mm. Thus, as the splice member 60 is applied to the first glass-web portion 30, gas can escape through the vent apertures 68 rather than collecting between the splice member 60 and the first glass-web portion 30.

Also similar to the first embodiment, the plurality of vent apertures 68 can optionally be arranged in a pattern to provide gas permeability to the splice member 60. For example, the vent apertures 68 may be arranged in the form of an array, as shown in FIG. 6. However, the vent apertures 68 may also be randomly positioned across the splice member 60.

Figure 9:
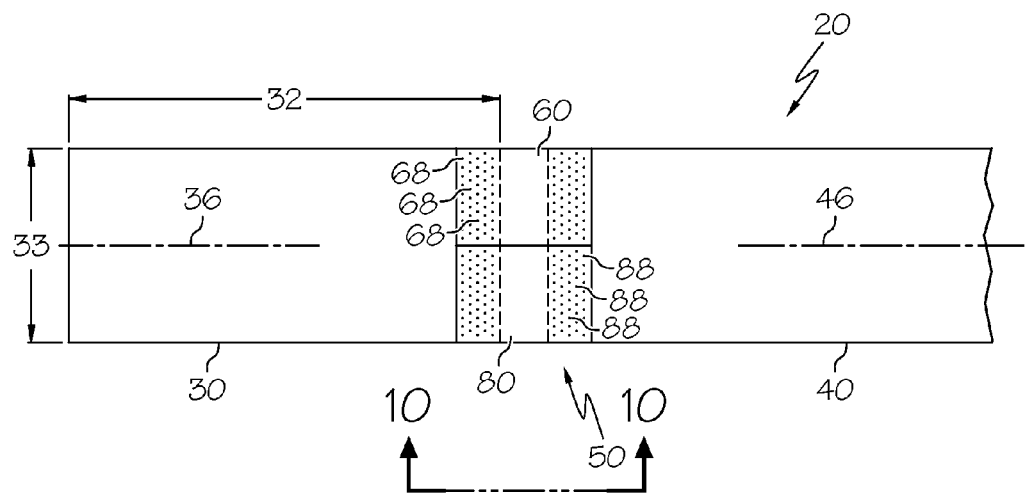
FIG. 9 is a top view of a glass web having a splice joint according to a fourth embodiment.
Figure 10:
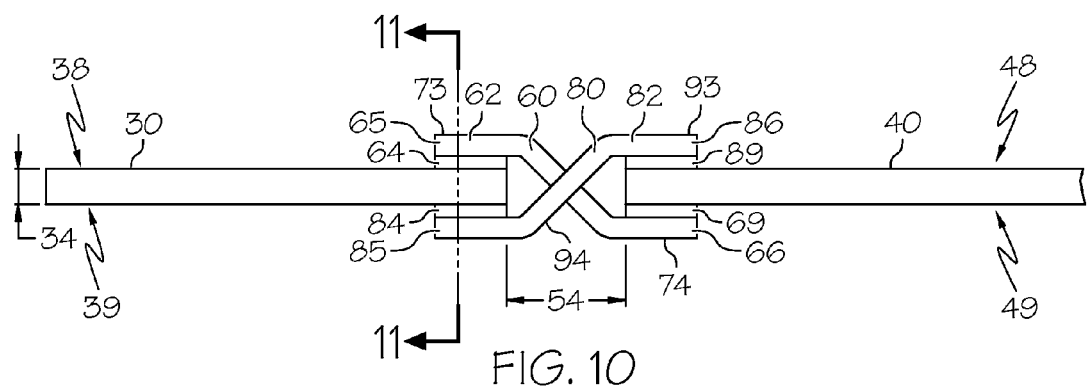
FIG. 10 is a side view of a glass web as seen along line 10-10 in FIG. 9.
Figure 11:
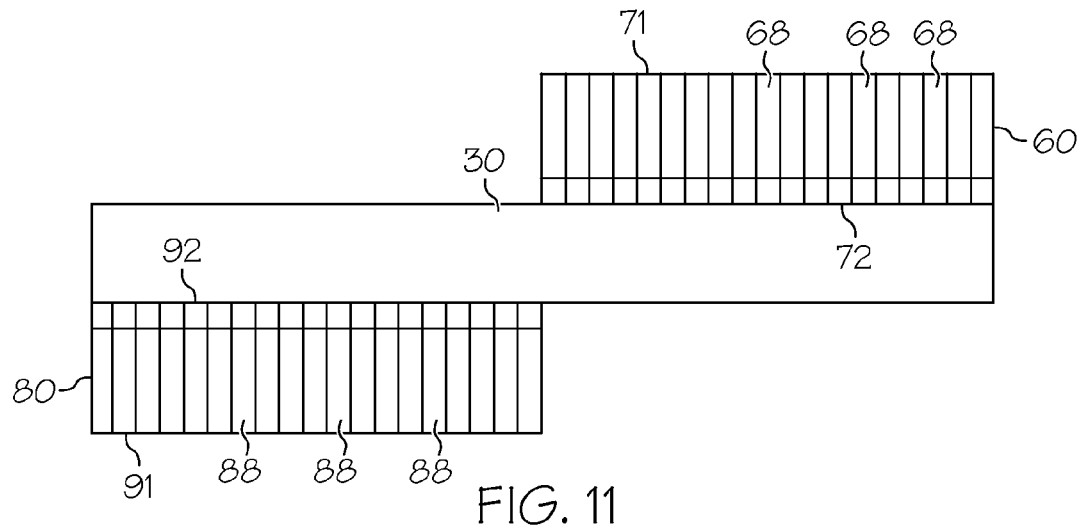
FIG. 11 is a cross-sectional view of a splice joint as taken along line 11-11 in FIG. 10.

A fourth embodiment of the splice joint 50 will now be explained in connection with FIGS. 9-11. In this embodiment, mainly the differences from the other embodiments will be described, with the understanding that the remaining elements are similar, for example identical, to those described in connection with the other embodiments, and wherein like reference numerals denote like elements throughout the embodiments. In this embodiment, attachment portions 65, 66 of the first splice member 60 are coupled to the first major surface 38 and the second major surface 49 respectively. Meanwhile, attachment portions 85, 86 of a second splice member 80 are coupled to the first major surface 48 and second major surface 39 respectively. The splice members 60, 80 are shown as being disposed side-by-side across the width 33, however, in some circumstances this need not be the case. Instead, the second splice member 80 may include an aperture through its middle portion and the first splice member 60 may be inserted therethough (or vice versa). Further, the splice members 60, 80 may be disposed across less than the entire width 33.

For the example embodiment, in order to couple the first splice member 60 to the first major surface 38 and the second major surface 49 as described above, adhesive layer 64 may be provided on surface 74 and adhesive layer 69 may be provided on surface 73. Similarly, in order to couple the second splice member 80 to the first major surface 48 and the second major surface 39, adhesive layer 84 may be provided on surface 93 and adhesive layer 89 may be provided on surface 94. As with the other embodiments, the adhesive layer 64, 69, 84, 89 can comprise a pressure sensitive or curable adhesive. Moreover, there may be embodiments wherein splice members 60, 80 do not have an adhesive layer. For example, splice members 60, 80 can be non-metallic members to which an electrostatic charge may be applied so as to electrostatically couple the splice members 60, 80 to portions 30, 40.

Attachment portions 65, 66, 85, 86 may be gas-permeable. Similar to other embodiments, this can be accomplished using gas-permeable materials for the splice members 60, 80. In addition or alternatively, as shown in FIGS. 9 and 11, the attachment portions 65, 66, 85, 86 can include apertures (e.g., perforations). FIG. 11 is a cross-sectional view of splice member 60, 80. As shown in FIG. 11, a plurality of vent apertures 68 extend through the first splice member 60 from the first surface 71 to the second surface 72 and a plurality of vent apertures 88 extend through the second splice member 80 from first surface 91 to the second surface 92. Each vent aperture 68, 88 may include a transverse dimension of between about 1 micron and about 2 mm although other sized apertures may be used in further examples. Thus, as the splice members 60, 80 are applied to the first glass-web portion 30, gas can escape through the vent apertures 68, 88 rather than collecting between the splice members 60, 80 and the first glass-web portion 30.

Figure 12:
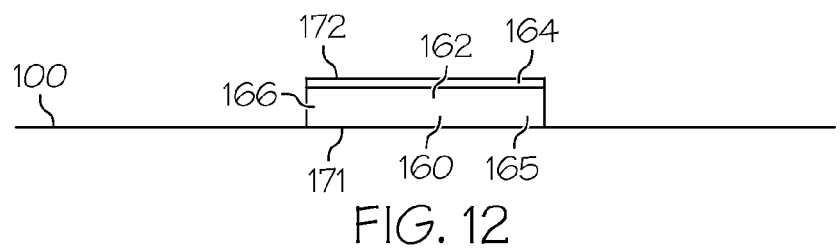
FIG. 12 is a side view of a splice member in accordance with a method as described in the specification.
Figure 14:
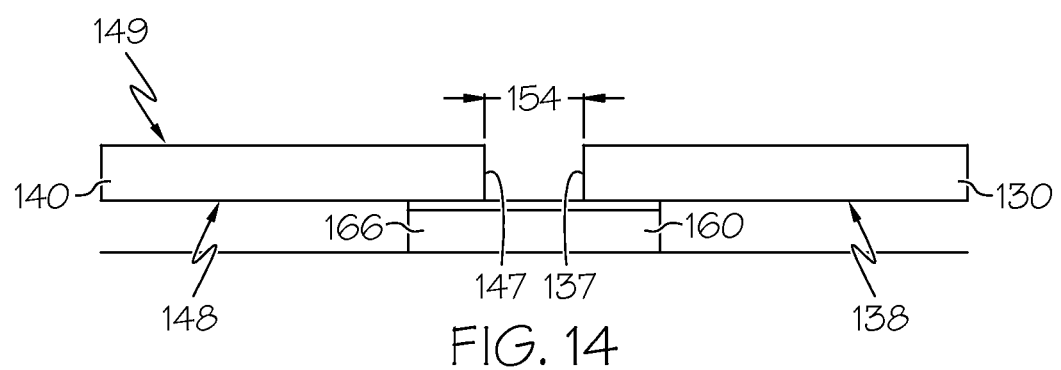
FIG. 14 is a view similar to FIG. 13, demonstrating the step of attaching a second web portion to the splice member.
Figure 15:
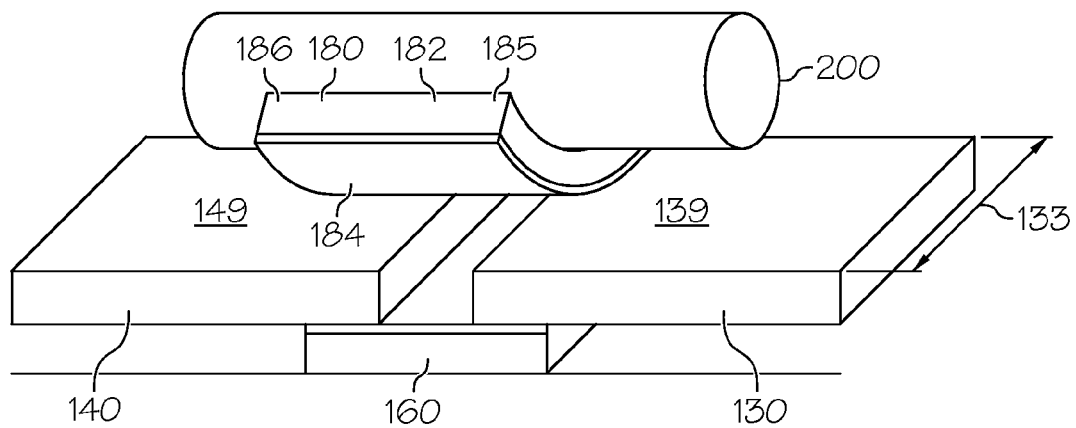
FIG. 15 is a view similar to FIG. 14, demonstrating the step of attaching a second splice member to the first and second web portions using a roller.
Figure 16:
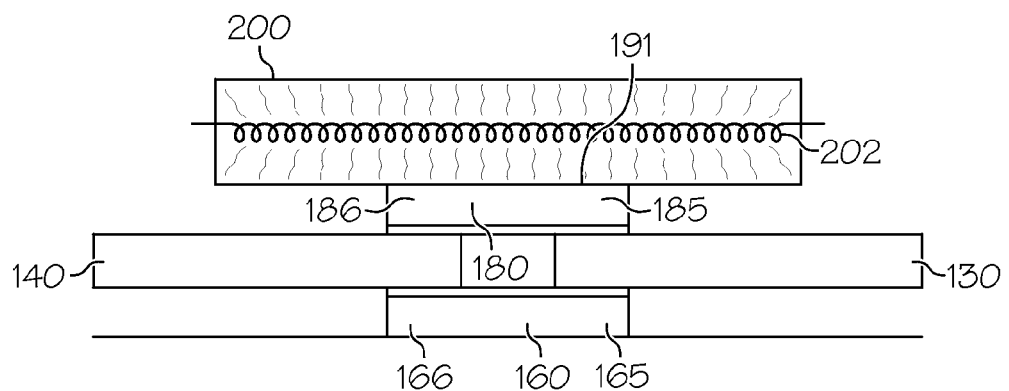
FIG. 16 is a view similar to FIG. 15, demonstrating the step of applying pressure and/or energy to the second splice member once the second splice member is attached to the web portions to remove gas entrapped between the web portions and splice members.

FIGS. 12-16 demonstrate an example method for splicing a first glass-web portion 130 to a second portion 140 for the representative splicing configuration shown in FIG. 16. Any of the aspects, for example all of the aspects of splicing illustrated in FIGS. 12-16 may be applied to any of the embodiments of the disclosure, for example, as discussed above with respect to FIGS. 1-11 above. As shown in FIG. 12, a first splice member 160 may be placed on a surface 100 so that surface 171 of the first splice member 160 faces support surface 100. The first splice member 160 may be a self-adhesive tape or a tape to which adhesive is applied. Alternatively, the splice member 160 may be a non-metallic member to which an electrostatic charge may be applied. The first splice member 160 in the example embodiment includes carrier layer 162, adhesive layer 164, attachment portion 165, and attachment portion 166. The carrier layer 162 can comprise a tape made of a flexible membrane. The adhesive layer 164 may comprise a pressure sensitive adhesive, curable adhesive (with thermal, UV, or other energy source) or other adhesive type. Attachment portions 165, 166 may be gas-permeable. As discussed above, this can be accomplished for example either by using materials for the splice member 160 that are gas permeable or by providing apertures (e.g., perforations) that extend fully or partially through the attachment portions 165, 166 from surface 171 to surface 172.

Figure 13:
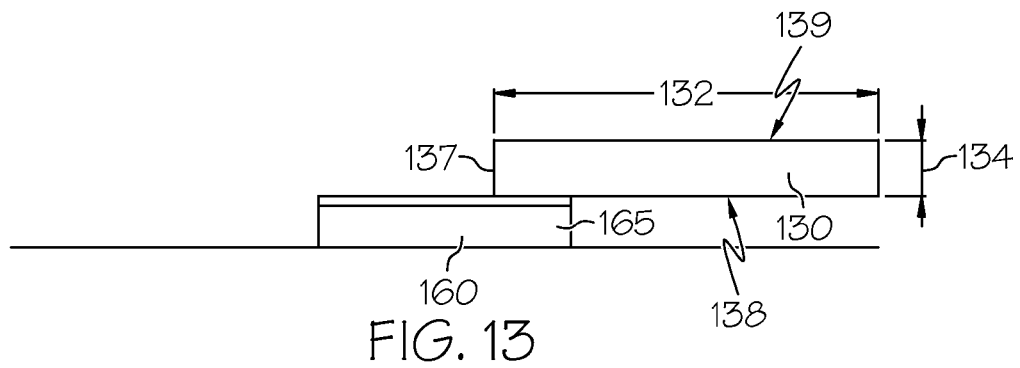
FIG. 13 is a view similar to FIG. 12, demonstrating the step of attaching a first web portion to the splice member.

Next, a first glass-web portion 130 is provided, as shown in FIG. 13. The first glass-web portion 130 may comprise a glass web that can include glass (e.g., transparent glass for example display quality transparent glass), glass ceramic, and ceramic materials and can also include multiple layers of continuous or patterned inorganic and organic material. The first glass-web portion 130 can be produced by way of a down-drawn, up-draw, float, fusion, press rolling, or slot draw, glass forming process or other techniques. The first glass-web portion 130 includes an end 137, a first major surface 138, and a second major surface 139. The length 132 of the first glass-web portion 130 can range from about 30 cm to about 1000 m and the width 133 can range from about 5 cm to about 1 m. The thickness 134 can range from about 10 microns to about 300 microns, for example from about 50 microns to about 200 microns. The first glass-web portion 130 may be applied to the first splice member 160 so that attachment portion 165 is coupled to the first major surface 138.

Next, a second portion 140 is provided, as shown in FIG. 14. The second portion 140 may be glass web that includes similar materials to the first glass-web portion 130, or the second portion 140 may be a leader or trailer made of a material other than glass, for example, polymer, paper, or metal. The dimensions of the second portion 140 can be the same or different from the first glass-web portion 130. Similar to the first glass-web portion 130, the second portion 140 includes an end 147, a first major surface 148, and a second major surface 149. The second portion 140 may be applied to the first splice member 160 so that attachment portion 166 is coupled to first major surface 148 and ends 137, 147 are spaced apart by a gap having a width 154. Additionally, the first major surface 138 of the first glass-web portion 130 may be oriented to be substantially coplanar with the first major surface 148 of the second portion 140. The width 154 of the gap may be between about 0.5 mm and about 5 mm although other sizes may be provided in further examples.

According to the method just described, a single-sided splice joint can be formed similar to the first embodiment described above. However, a double-sided splice joint can be formed with the additional step of providing a second splice member 180, as shown in FIG. 15. The second splice member 180 can have the same characteristics as the first splice member 160. For example, as shown in FIG. 15, the second splice member 80 can include a carrier layer 182, adhesive layer 184, attachment portion 185, and attachment portion 186. The second splice member 180 may be optionally rolled onto the portions 130, 140 (e.g., by roller 200) so attachment portion 185 attaches to the second major surface 139 of the first glass-web portion 130 and attachment portion 186 attaches to the second major surface 149 of the second portion 140. The rolling process for adhering splice member 180 can adhere the splice member 180 to web portions 130, 140 concurrently or sequentially. This rolling process can be used for application of either or both splice members 160, 180. Alternatively, a rolling process can be used to apply the web portion 130 or 140 to a stationary splice member 160 or 180. In some examples, both attachment portions 185, 186 may be gas permeable similar to the attachment portions 165, 166 of the first splice member 160.

Once the second splice member 180 is applied to the portions 130, 140, heat or pressure or some other energy source can be applied to the splice members 160, 180 to perform any required adhesive curing, bond strengthening or remove any gas that is entrapped between the splice members 160, 180 and portions 130, 140. For example, as shown in FIG. 17, a roller 200 can apply pressure to surface 191 of the second splice member 180. As pressure is applied, gas can escape through the gas-permeable attachment portions 165, 166, 185, 186. Additionally, heat or light or other energy can be applied to the splice members 160, 180 to cure the adhesive materials. For example, as schematically shown in FIG. 16, the roller 200 may include an optional heating mechanism 202 such that pressure and heat may optionally be provided simultaneously. Alternatively, the heat light or other energy can be applied to the splice members as the roller 200 is attaching the splice member to the web portions.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

For example, the application of the splice member(s) may be performed in a vacuum in order to further facilitate the removal of gas entrapped between the web portions and the splice member.

What is claimed is:

1. A glass web comprising:
    a first glass-web portion including an end, a first major surface facing a first direction and a second major surface facing a second direction opposite the first direction;
    a second portion including an end, a first major surface facing the first direction and a second major surface facing the second direction, wherein the end of the first glass-web portion and the end of the second portion are spaced apart by a gap;
    a splice joint coupling the end of the first glass-web portion to the end of the second portion, wherein the splice joint comprises a first splice member including a first gas-permeable attachment portion, a second gas-permeable attachment portion, and a length extending between an outer end of the first gas-permeable attachment portion and an outer end of the second gas-permeable attachment portion, the first splice member further including a carrier layer extending between the outer end of the first gas-permeable attachment portion and the outer end of the second gas-permeable attachment portion, and an adhesive layer attached to the carrier layer;

a first part of the adhesive layer comprising a first surface of the first gas-permeable attachment portion facing the first glass-web portion and attached to the first glass-web portion with the first part of the adhesive layer disposed between the carrier layer and the first glass-web portion, and the first gas-permeable attachment portion further comprising a second surface opposite the first surface, wherein the first gas-permeable attachment portion is gas-permeable all the way through the first gas-permeable attachment portion from the first surface to the second surface of the first gas-permeable attachment portion;

a second part of the adhesive layer comprising a first surface of the second gas-permeable attachment portion facing the second portion and attached to the second portion with the second part of the adhesive layer disposed between the carrier layer and the second portion, and the second gas-permeable attachment portion further comprising a second surface opposite the first surface of the second gas-permeable attachment portion, wherein the second gas-permeable attachment portion is gas-permeable all the way through the second gas-permeable attachment portion from the first surface of the second gas-permeable attachment portion to the second surface of the second gas-permeable attachment portion;

the splice joint further comprising a second splice member including a third gas-permeable attachment portion, a fourth gas-permeable attachment portion, and a length extending between an outer end of the third gas-permeable attachment portion and an outer end of the fourth gas-permeable attachment portion, the second splice member further including a carrier layer extending between the outer end of the third gas-permeable attachment portion and the outer end of the fourth gas-permeable attachment portion, and an adhesive layer attached to the carrier layer of the second splice member;

a first part of the adhesive layer of the second splice member comprising a first surface of the third gas-permeable attachment portion facing the first glass-web portion and attached to the first glass-web portion with the first part of the adhesive layer of the second splice member disposed between the carrier layer of the second splice member and the first glass-web portion, and the third gas-permeable attachment portion further comprising a second surface opposite the first surface of the third gas-permeable attachment portion, wherein the third gas-permeable attachment portion is gas-permeable all the way through the third gas-permeable attachment portion from the first surface to the second surface of the third gas-permeable attachment portion; and a second part of the adhesive layer of the second splice member comprising a first surface of the fourth gas-permeable attachment portion facing the second portion and attached to the second portion with the second part of the adhesive layer of the second splice member disposed between the carrier layer of the second splice member and the second portion, and the fourth gas-permeable attachment portion further comprising a second surface opposite the first surface of the fourth gas-permeable attachment portion, wherein the fourth gas-permeable attachment portion is gas-permeable all the way through the fourth gas-permeable attachment portion from the first surface of the fourth gas-permeable attachment portion to the second surface of the fourth gas-permeable attachment portion, wherein the first gas-permeable attachment portion is attached to the first major surface of the first glass-web portion, the second gas-permeable attachment portion is attached to the second major surface of the second portion, the third gas-permeable attachment portion is attached to the second major surface of the first glass-web portion, and the fourth gas-permeable attachment portion is attached to the first major surface of the second portion.

2. The glass web of claim 1, wherein the second portion comprises a second glass-web portion.

3. The glass web of claim 1, wherein a thickness of the first glass-web portion is from about 10 microns to about 300 microns.

4. The glass web of claim 1, wherein the carrier layer of the first splice member comprises a flexible membrane.

5. The glass web of claim 1, wherein the first gas-permeable attachment portion and the second gas-permeable attachment portion each include at least one vent aperture.

6. The glass web of claim 5, wherein the at least one vent aperture of the first gas-permeable attachment portion extends all the way through the first gas-permeable attachment portion from the first surface of the first gas-permeable attachment portion to the second surface of the first gas-permeable attachment portion; and the at least one vent aperture of the second gas-permeable attachment portion extends all the way through the second gas-permeable attachment portion from the first surface of the second gas-permeable attachment portion to the second surface of the second gas-permeable attachment portion.

7. The glass web of claim 1, wherein the adhesive layer of the first splice member extends along the entire length of the first splice member.

8. The glass web of claim 1, wherein the first gas-permeable attachment portion is made from a material that is gas permeable that at least partially provides gas permeability to the first gas-permeable attachment portion; and the second gas-permeable attachment portion is made from a material that is gas permeable that at least partially provides gas permeability to the second gas-permeable attachment portion.

9. The glass web of claim 8, wherein the first gas-permeable attachment portion and the second gas-permeable attachment portion each include at least one vent aperture that provides further gas permeability to the first gas-permeable attachment portion and the second gas-permeable attachment portion.

* * * * *